(12) United States Patent
Ito et al.

(10) Patent No.: US 6,848,664 B2
(45) Date of Patent: Feb. 1, 2005

(54) POWER SLIDING APPARATUS FOR A SEAT

(75) Inventors: Sadao Ito, Anjo (JP); Genta Moriyama, Anjo (JP); Naoaki Hoshihara, Obu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 180 days.

(21) Appl. No.: 10/359,163

(22) Filed: Feb. 6, 2003

(65) Prior Publication Data

US 2003/0168566 A1 Sep. 11, 2003

(30) Foreign Application Priority Data

Feb. 6, 2002 (JP) ........................................ 2002-029380

(51) Int. Cl.⁷ ............................................ F16M 13/00
(52) U.S. Cl. ..................................................... 248/429
(58) Field of Search ............................. 248/429, 298.1, 248/424; 297/330, 344.1

(56) References Cited

U.S. PATENT DOCUMENTS

| 3,184,209 | A |   | 5/1965 | Colautti |
| 4,707,030 | A | * | 11/1987 | Harding ...................... 297/341 |
| 4,969,621 | A | * | 11/1990 | Munchow et al. .......... 248/429 |
| 5,046,697 | A |   | 9/1991 | Detloff et al. |
| 5,349,878 | A | * | 9/1994 | White et al. ................ 74/89.14 |
| 5,746,409 | A | * | 5/1998 | Rees ........................... 248/422 |
| 5,810,315 | A |   | 9/1998 | Dinkel et al. |
| 5,950,978 | A | * | 9/1999 | Eguchi et al. ............... 248/429 |
| 6,193,203 | B1 | * | 2/2001 | Ikegaya et al. .............. 248/429 |
| 6,499,712 | B1 | * | 12/2002 | Clark et al. ................. 248/429 |
| 6,513,868 | B1 | * | 2/2003 | Tame .......................... 297/341 |

FOREIGN PATENT DOCUMENTS

| DE | 31 43 122 A1 | 5/1983 |
| JP | 10-968 A | 1/1998 |

* cited by examiner

Primary Examiner—Ramon O. Ramirez
Assistant Examiner—Amy J. Sterling
(74) Attorney, Agent, or Firm—Burns, Doane, Swecker & Mathis, L.L.P.

(57) ABSTRACT

A power sliding apparatus for a seat of the present invention includes a lower rail, an upper rail supporting a seat mounted thereon and engaged with the lower rail so as to be movable relative to each other, a screw equipped to one of the lower rail and the upper rail, a driving unit for driving the screw to be rotated so as to move the upper rail relative to the lower rail, a first rack provided at the other one of the lower rail and the upper rail and engaged with the screw having a predetermined clearance therebetween, and a second rack provided at the other one of the lower rail and the upper rail and engaged with the screw in contact therewith.

10 Claims, 4 Drawing Sheets

POWER SLIDING APPARATUS FOR A SEAT

CROSS REFERENCE TO RELATED APPLICATIONS

This application is based on and claims priority under 35 U.S.C. § 119 with respect to a Japanese Patent Application 2002-029380, filed on Feb. 6, 2002, the entire content of which is incorporated herein by reference.

FIELD OF THE INVENTION

This invention generally relates to a power sliding apparatus for adjusting a seat position in a forward/rearward direction. This type of power sliding apparatus is applied, for example to a vehicle so as to adjust a vehicle seat position in a vehicle longitudinal direction.

BACKGROUND OF THE INVENTION

A conventional power sliding apparatus for a seat is disclosed in a Japanese Patent Laid-Open publication published as No. 10(1998)-968. The disclosed power sliding apparatus includes an upper rail supporting a seat mounted thereon and a lower rail fixed to a vehicle floor and arranged to be slidable relative to the upper rail. The upper rail is equipped with a screw rotatably driven by a driving unit and the lower rail is provided with a rack having plural teeth defined in a vehicle longitudinal direction. When the screw arranged to be engaged with the rack of the lower rail is rotatably driven by the driving unit, the upper rail can be slidably moved relative to the lower rail in response to the rotation of the screw. Therefore, the power sliding apparatus can effectively adjust the seat position in the longitudinal direction.

When this type of power sliding apparatus is applied to adjust a vehicle seat position, the power sliding apparatus is required to be sufficiently solid and durable against excessive load which can be applied to the vehicle seat in the longitudinal direction due to a vehicle crash and so on. Otherwise, the seat position may not be able to be effectively maintained at an intended position.

According to the conventional type of power sliding apparatus, the screw and the rack are required to be made of metal so as to ensure the robustness of the power sliding apparatus and in order to achieve a downsized power sliding apparatus for an actual use in the vehicle. However, when the screw and the rack are in contact and engaged with each other with no gap therebetween, deterioration of durability thereof may be resulted from large friction generated therebetween. To overcome the problem, the screw and the rack can be arranged possessing a gap therebetween on a designing stage in order to ensure the durability. However, another problem may occur, in which looseness in the vehicle longitudinal direction between the upper rail and the lower rail may be caused and squeaks and rattles may occur when the power sliding apparatus is operated for positioning the vehicle seat.

The present invention therefore seeks to provide an improved power sliding apparatus capable of reducing the looseness between the upper rail and the lower rail and undesired noise. Further, the improved power sliding apparatus is able to ensure requisite solidness against impact load.

SUMMARY OF THE INVENTION

A power sliding apparatus for a seat of the present invention includes a lower rail, an upper rail supporting a seat mounted thereon and engaged with the lower rail so as to be movable relative thereto, a screw equipped to one of the lower rail and the upper rail, a driving unit for driving the screw to be rotated so as to move either the lower rail or the upper rail, a first rack provided at the other one of the lower rail and the upper rail and engaged with the screw having a predetermined clearance therebetween, and a second rack provided at the other one of the lower rail and the upper rail and engaged with the screw in contact therewith.

According to an aspect of the present invention, an elastic member pushes the screw towards the second rack with biasing force, wherein the second rack is made of resin, and the screw is made of metal.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Figure 1:
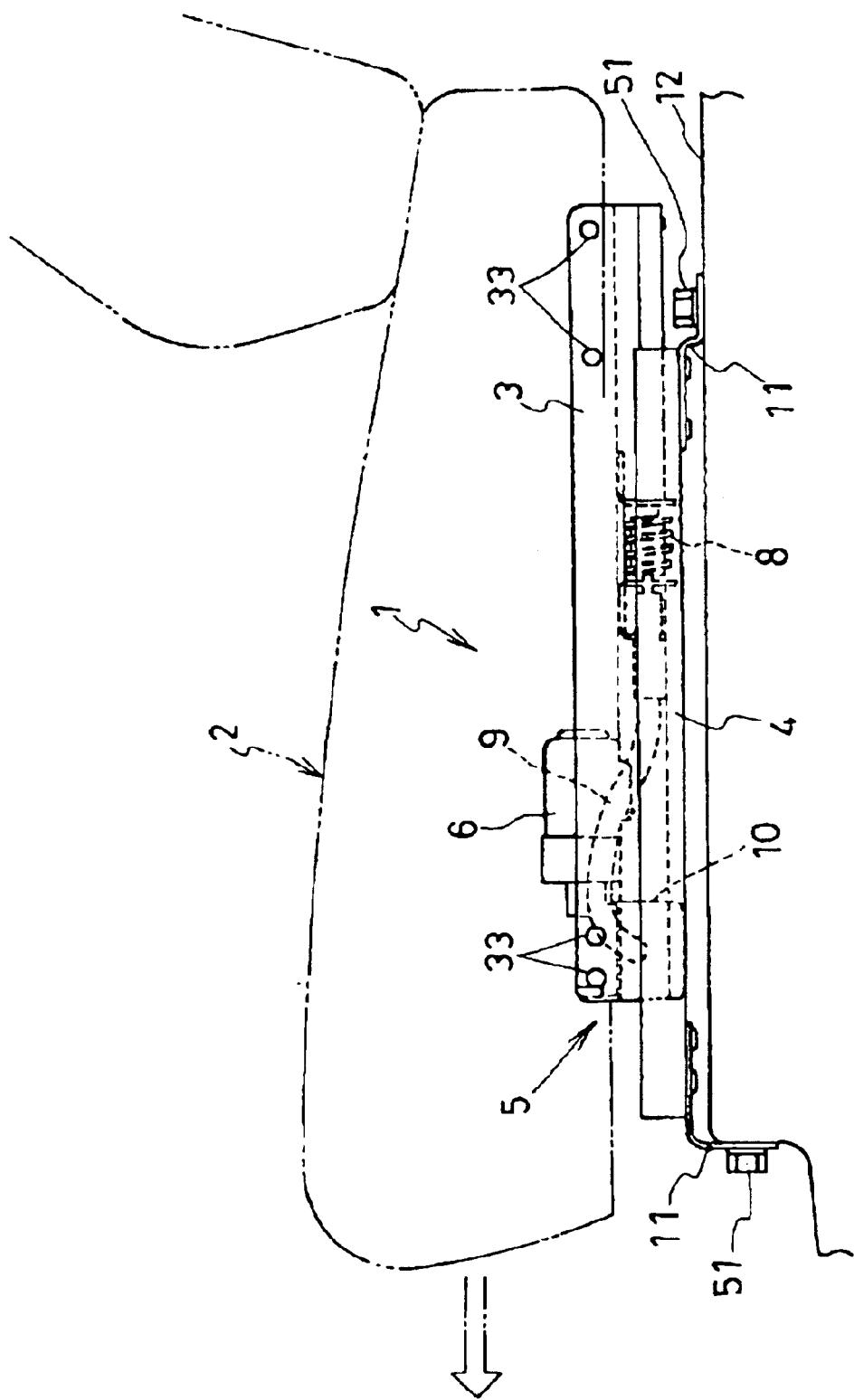
FIG. 1 is side view illustrating a seat provided with a power sliding apparatus according to an embodiment of the present invention.
Figure 2:
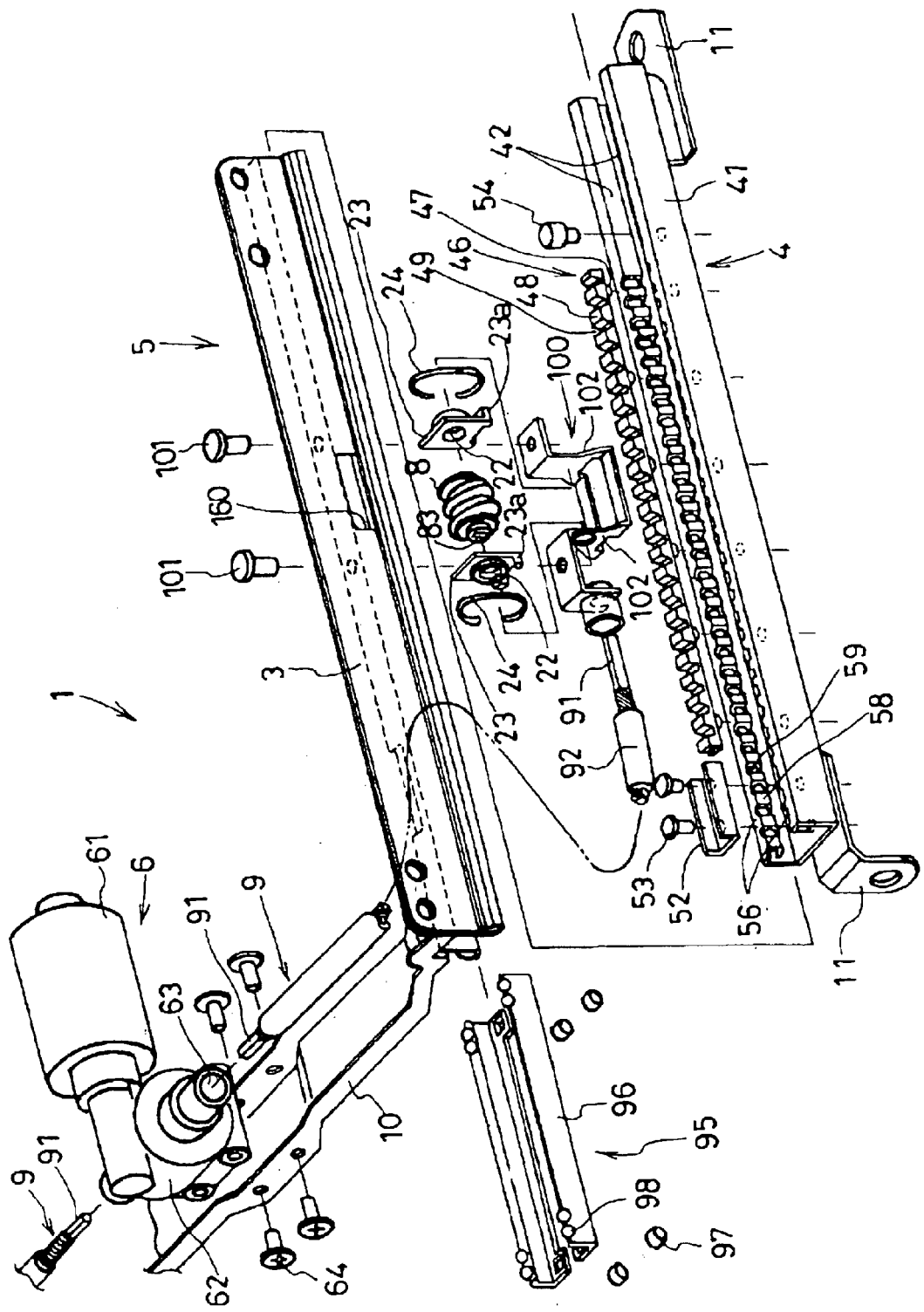
FIG. 2 is an exploded perspective view illustrating the power sliding apparatus according to the embodiment of the present invention.

As illustrated in FIGS. 1 and 2, a power sliding apparatus 1 according to an embodiment of the present invention includes a pair of sliding mechanisms 5 which are arranged in parallel to each other below a seat 2. Each sliding mechanism 5 is provided with a lower rail 4, which elongates in a longitudinal direction of the seat 2, i.e. in a right-hand and left-hand side direction of FIG. 1, and an upper rail 3, which is slidably movable relative to the lower rail 4. More particularly, the lower rail 4 and the upper rail 3 are arranged to be relatively slidable via a sliding mechanism 95 having a case 96, rollers 97, and balls 98. The lower rail 4 is fixedly mounted on a floor 12 (a stationary portion) by means of mounting screws 51 via brackets 11 fixed to front and rear ends of the lower rail 4. The upper rail 3 is secured to the seat 2 by means of plural fixing screws 33. The seat 2 is hence movable in the longitudinal direction relative to the floor 12 corresponding to the slidable movement of the upper rail 3 relative to the lower rail 4.

As especially seen in FIG. 2, the upper rails 3 arranged in parallel to each other below the seat 2 are interconnected via a connecting bracket 10 approximately horizontally extending in a lateral direction at a front portion of each upper rail 3. A driving unit 6 is fixedly disposed on the connecting bracket 10 by means of plural fixing screws 64 so as to slidably move the upper rail 3 relative to the lower rail 4. The driving unit 6 is provided with a motor 61 and a speed reduction mechanism 62. Output shaft halls 63 are defined at right and left ends of the speed reduction mechanism 62. Each output shaft hall 63 possesses an opening horizontally defined in the lateral direction and a cable shaft 91 of a rotation cable 9 is inserted into each output shaft hall 63. A square portion at a tip end of each cable shaft 91 is connected to a rotation shaft (not shown) of the speed reduction mechanism 62. Each rotation cable 9 connected to the speed reduction mechanism 62 is then guided in a right-hand side or left-hand side direction and another square portion of each cable shaft 91 is connected to a screw 8 equipped to each sliding mechanism 5. The driving unit 6 is wired from a power supplying unit (not shown) and the motor 61 can be rotated in a reciprocating direction, i.e. in a normal direction and in a reverse direction in response to manual operation of a switch (not shown) of the driving unit 6. Therefore, the screw 8 of each sliding mechanism 5 can be rotated by the motor 61. The screw 8 can be made of metal.

Figure 4:
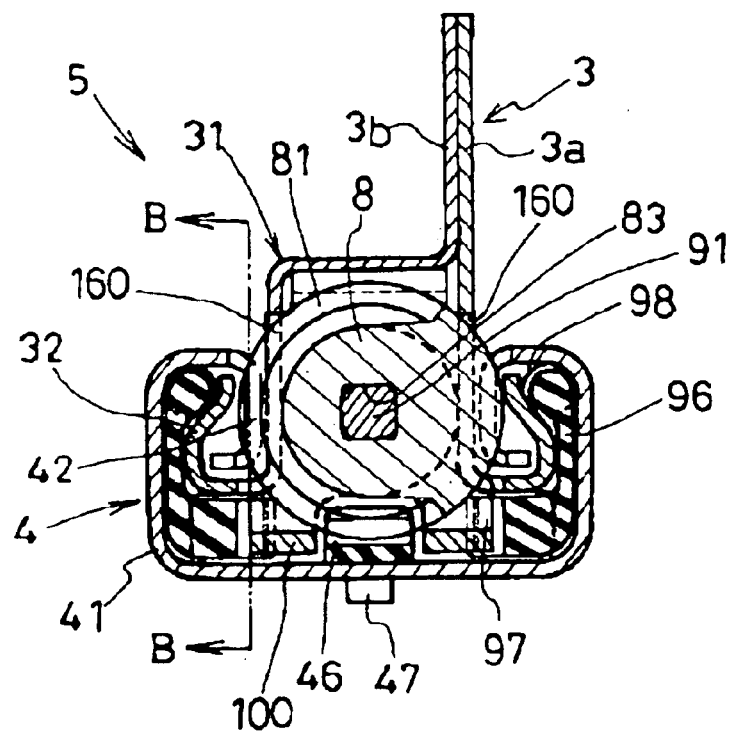
FIG. 4 is a cross-sectional view taken along line A—A in FIG. 3.

As especially seen in FIG. 4, the upper rail 3 is provided with an outer rail portion 3a and an inner rail portion 3b which are united by welding and extends in the longitudinal direction. The upper rail 3 is formed to have a base portion 31, which possesses a reverse U-shaped cross-section perpendicular to the longitudinal direction, and engaging portions 32 which are outwardly bent from bottom ends of the base portion 31 and extend in an upper direction. Notches 160 with a predetermined length in the longitudinal direction are defined at intermediate portions in the longitudinal direction of the outer and inner rail portions 3a and 3b. As also especially seen in FIG. 4, the lower rail 4 possesses a base portion 41 with an approximately U-shaped cross-section disposing the upper rail 3 in the U-shaped structure. Further, the lower rail 4 is provided with engaged portions 42 inwardly bent from upper ends of the base portion 41, extending in a lower direction and engaged with the engaging portions 32 of the upper rail 3.

As illustrated in FIG. 2, each engaged portion 42 of the lower rail 4 is provided with a first rack 56 at a predetermined portion in the longitudinal direction, and the first rack 56 possesses rack tooth-shaped portions 58 and gaps 59 defined between the respective tooth-shaped portions 58. The base portion 41 of the lower rail 4 is fixedly assembled with a second rack 46 extending in the longitudinal direction. The second rack 46 is formed with a material which may not generate large friction with metal, such as resin and is provided with plural rack tooth-shaped portions 48 and gaps 49 defined between the respective tooth-shaped portions 48. The second rack 46 is fixedly attached to the lower rail 4 via plural bosses 47 at a bottom surface of the second rack 46 disposed into holes defined on a bottom surface of the base portion 41. As especially seen in FIG. 2, a bracket 100 is disposed in the base portion 31 and is secured to an upper portion of the inner rail portion 3b. The bracket 100 is integrally provided with two vertically extending front and rear wall portions 102 arranged with a predetermined distance in the longitudinal direction therebetween. The screw 8, bearing plates 23 arranged at sides of both ends of the screw 8, and springs (elastic members) 24 are disposed between these two vertically extending wall portions 102.

The screw 8 is of an approximately cylindrical structure with a central axis extending in the longitudinal direction and possesses rotational shafts 82 at both ends thereof. The screw 8 is supportedly disposed in the bracket 100 with the rotational shafts 82 inserted into halls 22 in the bearing plates 23. The bearing plates 23 are disposed between the two wall portions 102 of the bracket 100 so as not to be rotatable relative to the upper rail 3 and the bracket 100 and so as to be slightly movable in a vehicle vertical direction. The springs 24 are disposed so as to be in contact with an upper surface of the base portion 31 and projections 23a integrally provided at bottom portions of the bearing plates 23. Therefore, the bearing plates 23 are biased in a lower direction by an elastic force of the springs 24.

The cylindrical screw 8 is provided with spiral tooth-portions 81 on an outer surface thereof and an outer diameter of the cylindrical screw 8 is greater than a width of the upper rail 3. Therefore, as illustrated in FIG. 2, the tooth-portions 81 of the screw 8 are outwardly exposed from the upper rail 3 via the notches 160, wherein the tooth-portions 81 are engageable with the rack tooth-portions 58 of the first rack 56. Each bottom side of each tooth-portion 81 is engaged with each rack tooth-portion 48 of the second rack 46. As the power sliding apparatus according to the embodiment of the present invention is provided with the above-described structure, the rack tooth-portions 48 and 58 are pushed by the spiral tooth-portions 81 in response to rotation of the screw 8 so that the upper rail 3 can be slidably moved relative to the lower rail 4.

Figure 3:
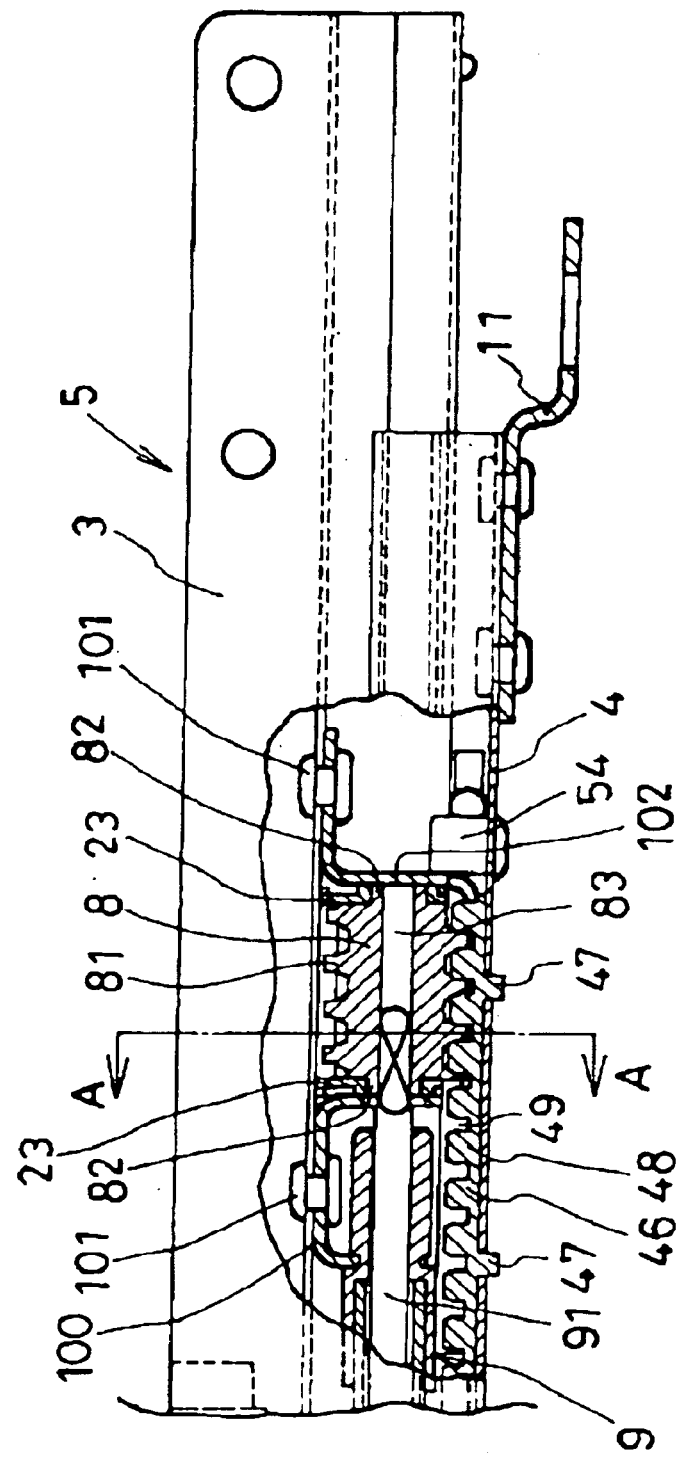
FIG. 3 is a partially cross-sectional view illustrating the power sliding apparatus illustrated in FIG. 2.

As especially seen in FIGS. 3 and 4, the screw 8 possesses a longitudinally extending axial hole 83 with an approximately square cross-section along with the central axis of the cylindrical screw 8. The axial hole 83 is inserted with the tip end of the rotation cable 9 guided from the speed reduction mechanism 62. Therefore, the screw 8 can be freely rotatable in a reciprocating direction, i.e. in a normal/reverse direction.

Figure 5:
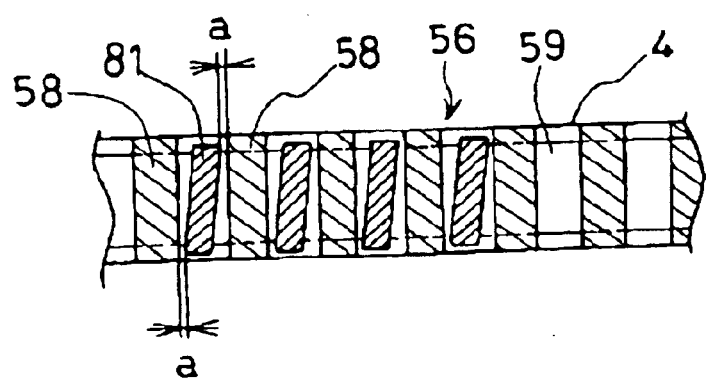
FIG. 5 is a cross-sectional view taken along line B—B in FIG. 4.

Referring to FIG. 5, each tooth-portion 81 of the screw 8 is disposed in the gap 59 of each rack tooth-portion 58 of the first rack 56 maintaining a clearance a between the tooth-portion 81 and the rack tooth-portion 58. Therefore, the tooth-portion 81 is not in contact with the rack tooth-portion 58 so that the diving force of the screw 8 is not transmitted to the first rack 56. Meantime, the tooth-portion 81 of the screw 8 is engaged with the rack tooth-portion 48 of the second rack 46 with no clearance therebetween. More specifically, the tooth-portion 81 of the screw 8 supported by the bearing plates 23 is more fixedly engaged with the rack tooth-portion 48 in favor of the springs 24 pushing the bearing plates 23 in the lower direction. Therefore, the power sliding apparatus 1 according to the embodiment of the present invention can be solid and durable to maintain the seat 2 at an intended position without causing looseness between the upper rail 3 and the lower rail 4 even when load vibration in the longitudinal direction is applied to the power sliding seat 1 or the seat 2 during the vehicle running and so on. The tooth-portions 81 and the rack tooth-portions 48 can be of a trapezoidal structure respectively. In this case, the tooth-portions 81 and the rack tooth-portions 48 are arranged to strongly come in contact with each other with wedge effect.

As illustrated in FIGS. 2 and 3, a front side stopper 52 is fixedly attached to a bottom surface of the base portion 41 by means of pins 53 and is in contact with a front end of the second rack 46. A rear side stopper 54 is also fixedly attached to the bottom surface of the base portion 41 and is in contact with a rear end thereof. Therefore, the front side stopper 52 and the rear side stopper 54 can effectively limit the longitudinal movement of the upper rail 3 relative to the lower rail 4 by becoming in contact with the front wall portion 102 of the bracket 100 and the rear wall portion 102 upon the slidable movement of the upper rail 3. In other words, the upper rail 3 can not be slidably moved in a vehicle forward direction beyond the front side stopper 52 and in the vehicle rearward direction beyond the rear side stopper 54.

Next, operation of the power sliding apparatus 1 according to the embodiment of the present invention is described hereinbelow.

The motor 6 is rotated in the reciprocating direction in response to the manual operation of the switch of the driving unit 6 so that the screw 8 is rotated via the speed reduction mechanism 62 and the rotation cable 9. The upper rail 3 is slidaly moved relative to the lower rail 4 by the engagement of the rotated screw 8 and the second rack 46. The movement of the seat 2 is stopped in response to terminating of the switch operation when the seat 2 is moved to an intended position and the seat 2 can be effectively maintained at the intended position. In this case, the second rack 46 made of resin and so on is engaged with the screw 8 with small friction resistance therebetween and with almost no clearance therebetween. Therefore, the movement of the seat 2 can be performed noiselessly and the seat 2 can be maintained at the intended position without causing any looseness.

If the seat 2 maintained as described above is unexpectedly applied with large impulse load in a vehicle forward/rearward direction (if applied to a vehicle) due to a vehicle crash and the large impulse reaches a predetermined value, the second rack 46 made of resin and so on may be deformed and the screw 8 may be slightly displaced in a direction of the impulse load. The tooth-portion 81 of the screw 8 and the rack tooth-portion 58 of the first rack 56 may become contact with each other without maintaining the clearance a therebetween. Therefore, the impulse shock applied to the screw 8 is transmitted to the lower rail 4 possessing larger robustness than the one of the upper rail 3, wherein the seat 2 can be sufficiently strong to endure the large impulse load.

According to the embodiment of the present invention, when the power sliding apparatus 1 is normally operated, the screw 8 and the second rack 46 are engaged with almost no clearance therebetween. Therefore, almost no looseness can be caused in the longitudinal direction between the upper rail 3 and the lower rail 4. That is, the upper rail 3 can be noiselessly moved relative to the lower rail 4. Further, when the power sliding apparatus 1 is applied with large impulse shock, the screw 8 becomes in contact with the first rack 56 and the impulse shock is transmitted to the lower rail 4 possessing larger robustness than the one of the upper rail 3. Therefore, the power sliding apparatus 1 can be sufficiently strong to endure the large impulse shock.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A power sliding apparatus for a seat comprising:
   a lower rail;
   an upper rail supporting a seat mounted thereon and engaged with the lower rail so as to be movable relative thereto;
   a screw provided at one of the lower rail and the upper rail;
   a driving unit for driving the screw to be rotated so as to move the upper rail relative to the lower rail;
   a first rack and a second rack provided at the other one of the lower rail and the upper rail;
   the first rack being engaged with the screw having a predetermined clearance therebetween;
   the second rack being engaged with the screw in contact therewith; and
   an elastic member pushing the screw towards the second rack with biasing force, wherein the second rack is made of resin, and the screw is made of metal.

2. A power sliding apparatus for a seat comprising;
   an upper rail supporting a seat mounted thereon and engaged with the lower rail so as to be movable relative thereto;
   a screw provided at one of the lower rail and the upper rail;
   a driving unit for driving the screw to be rotated so as to move the upper rail relative to the lower rail;
   a first rack and a second rack provided at the other one of the lower rail and the upper rail;
   the first rack being engaged with the screw having a predetermined clearance the second rack being engaged with the screw in contact therewith; and
   wherein the predetermined clearance between the first rack and the screw is maintained when no load is applied to the seat in a forward or rearward direction, and the first rack and the screw become in contact with each other without the clearance therebetween when the load is applied to the seat in the forward or rearward direction and reaches a predetermined value, wherein the load is transmitted to the other one of the lower rail and the upper rail via the first rack.

3. A power sliding apparatus for a seat according to claim 2, wherein the screw is provided at the upper rail, the first rack and the second rack are provided at the lower rail, and the screw is driven by the driving unit so as to move the upper rail relative to the lower rail.

4. A power sliding apparatus for a seat according to claim 3, wherein the lower rail is fixedly attached to a stationary portion.

5. A power sliding apparatus for a seat according to claim 2, wherein the first rack is integrally provided at said other one of the first and second rails, and the first rack possesses plural rack tooth-portions and gaps defined between the respective rack tooth-portions, the screw possesses plural tooth-portions on an outer surface thereof, and the respective tooth-portions of the screw are engaged with the respective rack tooth-portions of the first rack with the predetermined clearance between the respective tooth-portions of the screw and the respective rack tooth-portions of the first rack.

6. A power sliding apparatus for a seat according to claim 1, wherein the second rack possesses plural rack tooth-portions and gaps defined between the respective rack tooth-portions, the screw possesses plural tooth-portions on an outer surface thereof, and the respective tooth-portions of the screw are engaged with the respective rack tooth-portions of the second rack.

7. A power sliding apparatus for a seat according to claim 6, wherein the respective rack tooth-portions of the second rack and the respective tooth-portions of the screw possess trapezoidal structures.

8. A power sliding apparatus for a seat according to claim 2, further comprising:
   an elastic member pushing the screw towards the second rack with a biasing force, wherein the second rack is made of resin, and the screw is made of metal.

9. A power sliding apparatus for a seat according to claim 2, wherein the second rack possesses plural rack tooth-portions and gaps defined between the respective rack tooth-portions, the screw possesses plural tooth-portions on an outer surface thereof, and the respective tooth-portions of the screw are engaged with the respective rack tooth-portions of the second rack.

10. A power sliding apparatus for a seat according to claim 9, wherein the respective rack tooth-portions of the second rack and the respective tooth-portions of the screw possess trapezoidal structures.

* * * * *